W. HOWARD.
Cheese Vat.
No. 77,734.
Patented May 12, 1868.
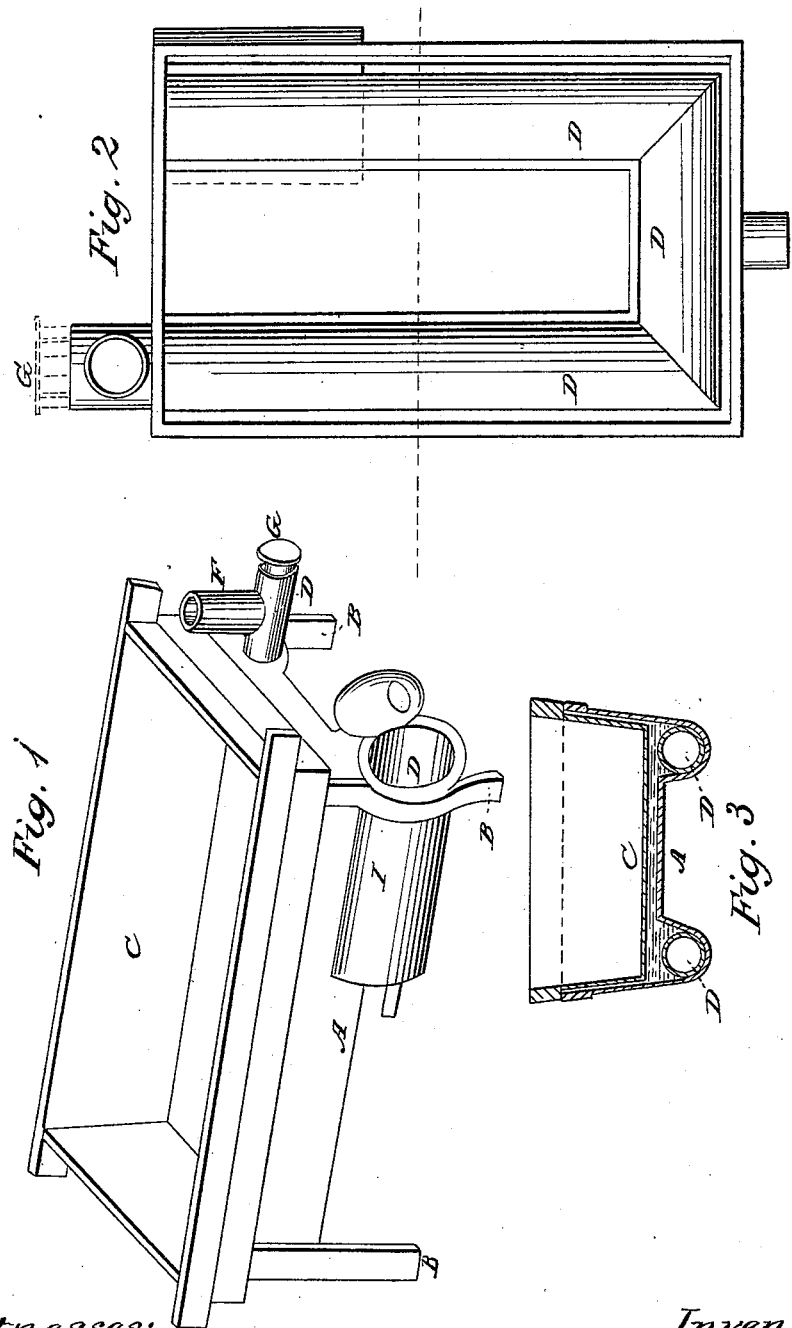
Witnesses:
J. G. Harbottle
E. G. Harbottle
Inventor:
William Howard

United States Patent Office.

WILLIAM HOWARD, OF WATERTOWN, NEW YORK.

Letters Patent No. 77,734, dated May 12, 1868.

IMPROVEMENT IN CHEESE-VATS.

*The Schedule referred to in these Letters Patent and making part of the same.*

TO ALL WHOM IT MAY CONCERN:

Be it known that I, WILLIAM HOWARD, of Watertown, Jefferson county, New York, have invented certain new and useful Improvements in Apparatus for Heating and Cooling Milk for Cheese-Making; and I do hereby declare the following to be a full, clear, and exact description of the construction and operation of the same, reference being had to the accompanying drawing, making part of this specification, in which—

Figure 1 represents a perspective view of a cheese-vat or heater.

Figure 2 represents a top view of vat, with inner or milk-holding vat removed.

Figure 3 represents a vertical transverse section on red line, fig. 2.

The object of my invention is to more thoroughly heat the milk in the inner vat, to render the vat more compact, and to readily cool the same; and my invention consists in arranging the pipe or chamber, through which the heat and smoke from the fire-box pass about the sides and end of the vat, thereby completely utilizing all the heat in the smoke, heating the water in the main vat, and consequently the milk in the inner vat more thoroughly, evenly, and perfectly than heretofore; and also in providing the smoke-pipe, which acts as chimney for fire-box, with a damper, between the fire-box and the vertical portion of the smoke-pipe, so that when it is desired to cool the chamber quickly, the damper may be turned or opened, thereby supplying the vertical draw-pipes with air at its base, which stops the fire quickly in the fire-box.

A represents an external vat, such as are commonly used in cheese-dairies or in cheese-making. In the interior of this vat, and resting on its top portion, is the usual vat, containing the milk to be heated, there being a space between such vats filled with water, which is to be heated by the pipe D. Vat A is supported on suitable legs B, and has under it, at one corner, a fire-chamber or box, H, enclosed in an outer chamber, I, there being the usual water-space between them.

The pipe D connects with the fire-chamber, passes along the side of the vat, through the water, thence along the end, thence back along the opposite side, and out through the vat, where it is connected to a vertical pipe, F.

At the bottom of the pipe I place a damper, G. The pipe D lies in the water in the vat, as shown, heats the water in the vat evenly, and the water thus heated, in a like manner heats the milk in the vat.

The even diffusion of heat throughout the milk is of the greatest importance, and any arrangement of parts whereby the heat is more evenly distributed throughout the milk in the vat will prove of great benefit to cheese-makers.

In other vats very much heat is wasted in the smoke, but by my arrangement of pipes nearly all this otherwise wasted heat is utilized and evenly diffused, which is considered a great improvement.

When the milk has been sufficiently heated it is desirable to cool it quickly, to accomplish which I remove the damper G, thereby stopping the draught of air proceeding along fire-box D, up E, the opening made by withdrawal of damper G. This supplies the pipe F, and causes the fire to die down quickly.

Having described my invention, what I claim as new, and desire to secure by Letters Patent, is—

1. The combination, with outer and inner vats, of a fire-chamber, and heat and smoke-conducting pipes, arranged about the sides of and between the vats, as and for the purposes set forth.

2. The combination, with the heat and smoke-conducting pipes and vat, of a damper, arranged as and for the purposes set forth.

WILLIAM HOWARD,

Witnesses:
J. G. HARBOTTLE,
E. G. HARBOTTLE.